(12) United States Patent
Tian et al.

(10) Patent No.: US 8,482,932 B2
(45) Date of Patent: Jul. 9, 2013

(54) MOTHERBOARD ASSEMBLY HAVING SERIAL ADVANCED TECHNOLOGY ATTACHMENT DUAL IN-LINE MEMORY MODULE

(75) Inventors: Bo Tian, Shenzhen (CN); Guo-Yi Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 203 days.

(21) Appl. No.: 13/207,680

(22) Filed: Aug. 11, 2011

(65) Prior Publication Data

US 2013/0038997 A1 Feb. 14, 2013

(30) Foreign Application Priority Data

Jul. 22, 2011 (CN) .......................... 2011 1 0206543

(51) Int. Cl.
*H05K 1/11* (2006.01)
(52) U.S. Cl.
USPC ............. 361/784; 361/785; 361/798; 439/62; 439/160; 439/347; 439/630; 439/660; 710/301; 711/104

(58) Field of Classification Search
USPC .................... 361/784, 785, 798; 439/62, 160, 439/326, 347, 630, 660; 710/301; 711/104
See application file for complete search history.

(56) References Cited

U.S. PATENT DOCUMENTS

| | | | | |
|---|---|---|---|---|
| 5,393,234 | A | * | 2/1995 | Yamada et al. ................. 439/62 |
| 5,697,802 | A | * | 12/1997 | Kawabe ......................... 439/326 |
| 5,805,903 | A | * | 9/1998 | Elkhoury ....................... 713/300 |
| 2005/0003692 | A1 | * | 1/2005 | Allirot .......................... 439/160 |
| 2008/0065805 | A1 | * | 3/2008 | Wu et al. ....................... 710/301 |
| 2010/0159750 | A1 | * | 6/2010 | Lee et al. ...................... 439/660 |
| 2010/0241799 | A1 | * | 9/2010 | Schuette ....................... 711/104 |

\* cited by examiner

*Primary Examiner* — Xiaoliang Chen
(74) *Attorney, Agent, or Firm* — Altis Law Group, Inc.

(57) ABSTRACT

A motherboard assembly includes a serial advanced technology attachment dual-in-line memory module (SATA DIMM) with a circuit board, a memory slot, and an interface. An edge connector is set on a bottom edge of the circuit board. A SATA connector is arranged on the circuit board, and connected to a control chip and the interface, enabling a motherboard communication with the SATA DIMM module.

6 Claims, 3 Drawing Sheets

MOTHERBOARD ASSEMBLY HAVING SERIAL ADVANCED TECHNOLOGY ATTACHMENT DUAL IN-LINE MEMORY MODULE

CROSS-REFERENCE OF RELATED APPLICATION

Relevant subject matter is disclosed in a co-pending U.S. patent application with application Ser. No. 13/172,603, filed on Jun. 29, 2011, with the same title "SERIAL ADVANCED TECHNOLOGY ATTACHMENT DIMM", which are assigned to the same assignee as this patent application.

BACKGROUND

1. Technical Field

The present disclosure relates to a motherboard assembly having a serial advanced technology attachment dual in-line memory module (SATA DIMM).

2. Description of Related Art

Solid state drives (SSD) store data on chips instead of on magnetic or optical discs. One type of SSD has the form factor of a DIMM module and it is called a SATA DIMM module. The SATA DIMM module can be inserted into a memory slot of a motherboard, to receive voltages from the motherboard through the memory slot and receive hard disk drive (HDD) signals through SATA connectors arranged on the SATA DIMM module and connected to a SATA connector of the motherboard. However, a traditional SATA DIMM module can only be inserted into one of the double data rate type two (DDR2) slots and double data rate type three (DDR3) slot, therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings, is illustrated by way of example and not by way of limitation. References to "an" or "one" embodiment in this disclosure are not necessarily to the same embodiment, and such references mean at least one.

Figure 1:
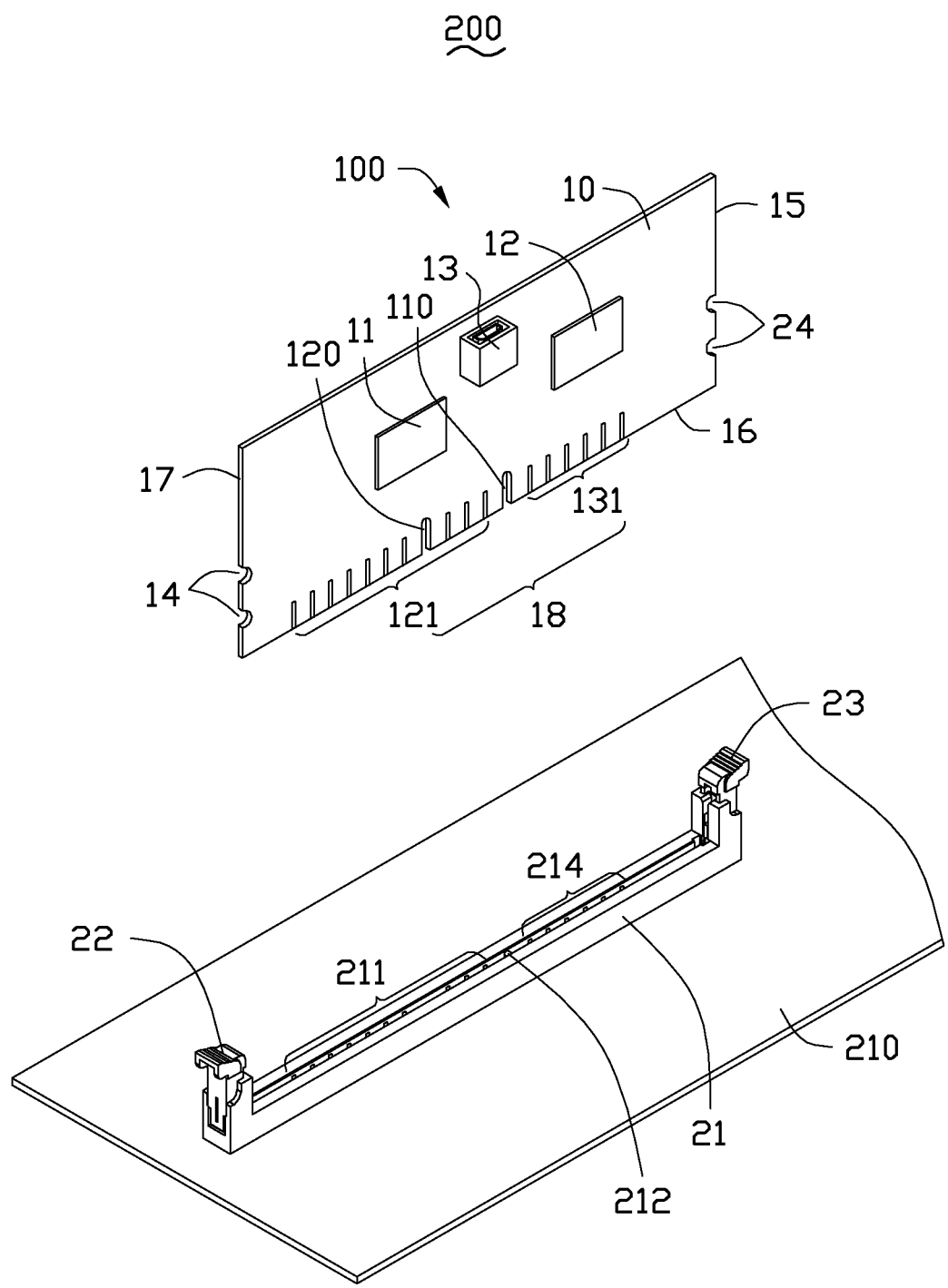
FIG. 1 is a schematic diagram of a motherboard assembly in accordance with a first exemplary embodiment of the present disclosure, wherein the motherboard assembly includes a double data rate type two (DDR2) memory slot.

Referring to FIG. 1, a motherboard assembly 200 in accordance with a first exemplary embodiment includes a motherboard 210, a serial advanced technology attachment dual-in-line memory module (SATA DIMM) module 100, a memory slot 21 arranged on the motherboard 210, and an interface 6 (shown in FIG. 3) arranged on the motherboard 210.

The SATA DIMM module 100 includes a substantially rectangular circuit board 10. A control chip 11, a power circuit 12, and a connector 13 are arranged on the circuit board 10. An edge connector 18 is arranged on the bottom edge 16 of the circuit board 10. Two spaced notches 110 and 120 are defined in the edge connector 18. The edge connector 18 includes a plurality of power pins 121 and a plurality of ground pins 131. The power pins 121 are connected to the power circuit 12. The connector 13 is connected to the control chip 11. The ground pins 131 are connected to a ground layer (not shown) of the circuit board 10. Two grooves 14 are defined in a first end 17 of the circuit board 10, and two grooves 24 are defined in a second end 15 of the circuit board 10. The distance between the first end 17 and the notch 120 is about 5.4 centimeters (cm). The distance between the first end 17 and the notch 110 is about 7 cm. In one embodiment, the connector 13 is a SATA connector. The interface 6 is a SATA connector.

In the embodiment, the memory slot 21 is a double data rate type two (DDR2) memory slot. The memory slot 21 includes a plurality of pins, a protrusion 212 arranged in the memory slot 21, and two fixing elements 22 and 23 arranged at the first and second ends of the memory slot 21. The distance between the protrusion 212 and the first end of the memory slot 21 is about 7 cm. The pins of the memory slot 21 includes power pins 211 corresponding to the power pins 121 and ground pins 214 corresponding to the ground pins 131. The power pins 211 and the ground pins 214 are respectively connected to a power layer and a ground layer (not shown) of the motherboard 210. The protrusion 212 is located in the memory slot 21 and engaged with the notch 110. The notch 110 is located between the power pins 121 and the ground pins 131. The notch 120 divides the power pins 121 into two parts.

Figure 2:
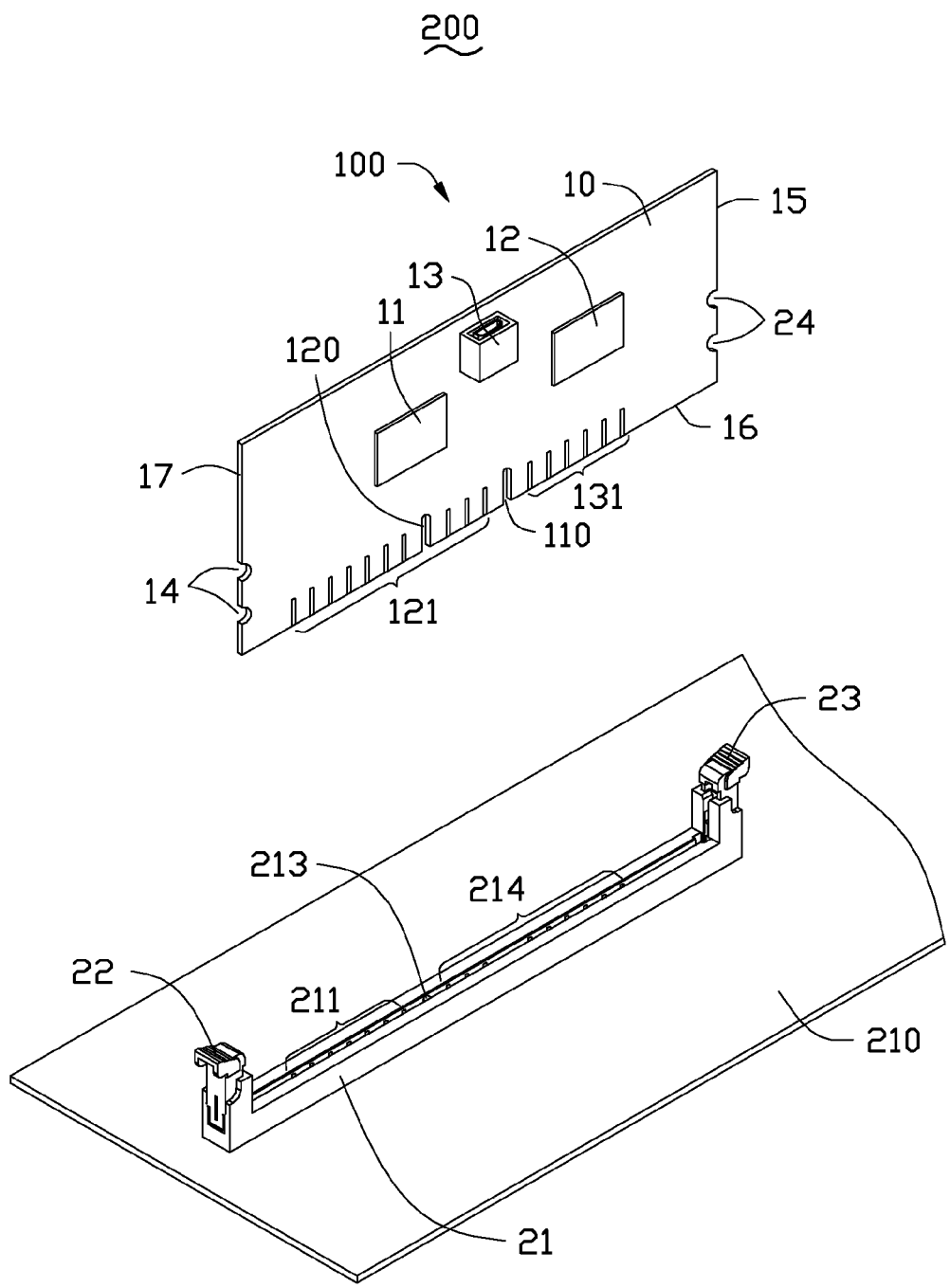
FIG. 2 is a schematic diagram of a motherboard assembly in accordance with a second embodiment of the present disclosure, wherein the motherboard assembly includes a double data rate type three (DDR3) memory slot.

Referring to FIG. 2, in a second embodiment, the memory slot 21 is a double data rate type three (DDR3) slot. The memory slot 21 includes a plurality of pins, a protrusion 213 arranged in the memory slot 21, and two fixing elements 22 and 23 arranged at the first and second ends, respectively, of the memory slot 21. The protrusion 213 is closer to the first end of the memory slot 21 than the protrusion 212 of the DDR2 memory slot. The pins of the memory slot 21 includes power pins 211 corresponding to the power pins 121 and ground pins 214 corresponding to the ground pins 131. The power pins 211 and the ground pins 214 of the memory slot 21 are respectively connected to a power layer and a ground layer (not shown) of the motherboard 210. The protrusion 213 divides the power pins 211 into two parts.

Figure 3:
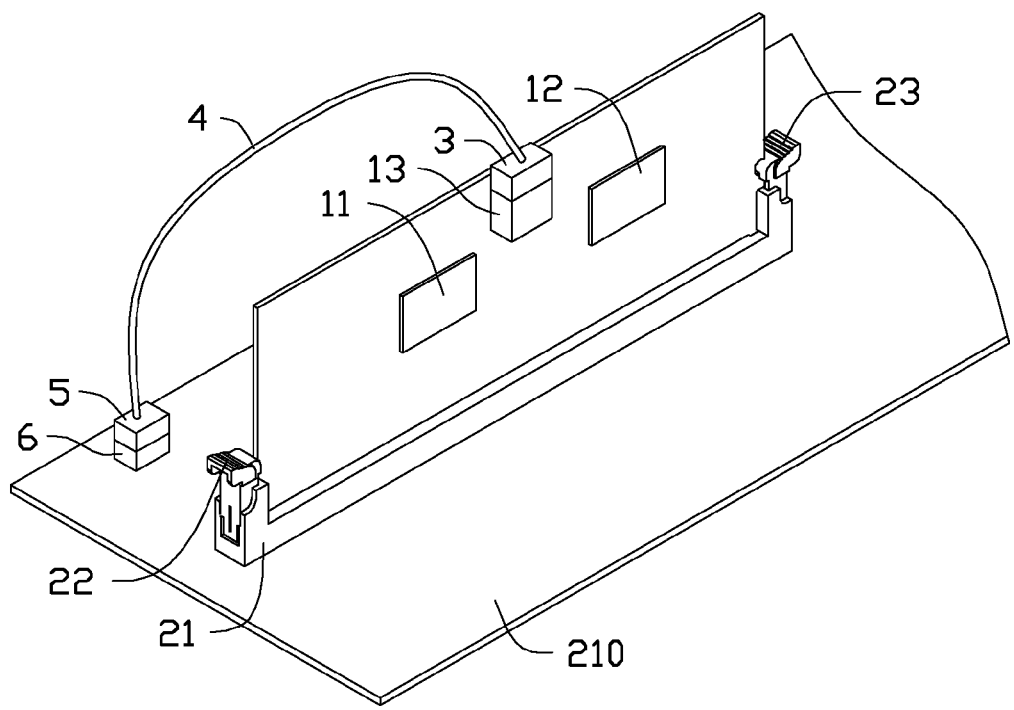
FIG. 3 is an assembled diagram of the motherboard assembly of FIG. 1.

Referring to FIG. 3, in assembling the SATA DIMM module 100 to the memory slot 21 of the first embodiment, the edge connector 18 is inserted into the memory slot 21. The power pins 121 are connected to the power pins 211, and the ground pins 131 are connected to the ground pins 214. The protrusion 212 is engaged in the notch 110. The fixing elements 22 and 23 are engaged in the grooves 14 and 24, respectively. An interface 3 at a first end of a cable 4 is connected to the connector 13. An interface 5 at a second end of the cable 4 is connected to the interface 6.

When the motherboard 210 receives power, the motherboard 210 outputs a voltage to the power circuit 12 through the power pins 211 and 121. The power circuit 12 converts the received voltage and provides it to the control chip 11 and other elements of the SATA DIMM module 100. At the same time, the motherboard 210 outputs a hard disk drive (HDD) signal to the control chip 11 through the interface 6 to communicate with the SATA DIMM module 100.

In assembling the SATA DIMM module 100 to the memory slot 21 of the second embodiment, the edge connector 18 is inserted into the memory slot 21. The power pins 121 are connected to the power pins 211, and the ground pins 131 are connected to the ground pins 214. The protrusion 213 is engaged in the notch 120. The fixing elements 22 and 23 are engaged in the grooves 14 and 24, respectively.

Even though numerous characteristics and advantages of the disclosure have been set forth in the foregoing description, together with details of the structure and function of the disclosure, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. A motherboard assembly, comprising:
a motherboard comprising an interface and a memory slot, the memory slot comprising:
a plurality of first power pins and a plurality of first ground pins; and
a protrusion arranged in the memory slot; and
a serial advanced technology attachment dual-in-line memory module (SATA DIMM) comprising:
a circuit board comprising:
an edge connector set on a bottom edge of the circuit board to engage in the memory slot, the edge connector comprising a plurality of second power pins to connect the first power pins and a plurality of second ground pins to connect the first ground pins;
a first notch defined in the edge connector, wherein the distance between the first notch and a first end of the circuit board is about 7 centimeters;
a second notch defined in the edge connector, wherein the distance between the second notch and the first end of the circuit board is about 5.4 centimeters;
a power circuit arranged on the circuit board and connected to the plurality of second power pins of the edge connector;
a control chip; and
a SATA connector arranged on the circuit board, and connected to the control chip of the circuit board and the interface of the motherboard; wherein the protrusion of the memory slot is selectively connected to one of the first and second notches of the circuit board.

2. The motherboard assembly of claim 1, wherein the memory slot is a double data rate type two (DDR2) memory slot, the protrusion of the memory slot is engaged in the first notch of the circuit board.

3. The motherboard assembly of claim 1, wherein the memory slot is a double data rate type three (DDR3) memory slot, the protrusion of the memory slot is engaged in the second notch of the circuit board.

4. The motherboard assembly of claim 1, wherein the SATA connector of the SATA DIMM module is connected to the interface of the motherboard through a cable with two interfaces.

5. The motherboard assembly of claim 4, wherein the interface of the motherboard is a serial advanced technology attachment (SATA) connector.

6. The motherboard assembly of claim 1, wherein the circuit board is rectangular, the bottom edge of the circuit board is a long edge, the first end of the circuit board is a short edge, two grooves are respectively defined in two opposite short edges of the circuit board, the memory slot further comprises two fixing elements arranged on two ends of the memory slot, the fixing elements of the memory slot engage in the grooves of the circuit board, respectively, to fix the SATA DIMM module to the memory slot.

* * * * *